United States Patent
Myles

[15] 3,682,532
[45] Aug. 8, 1972

[54] OPTICAL SYSTEM TO REDUCE IMAGE TO LENS DISTANCE BY POLARIZATION CONTROL

[72] Inventor: Walter Edward Myles, Alexandria, Va.

[73] Assignee: The Singer Company, New York, N.Y.

[22] Filed: Feb. 3, 1971

[21] Appl. No.: 112,131

[52] U.S. Cl. ............... 350/157, 350/147, 350/152, 350/169
[51] Int. Cl. ........................... G02b 27/28
[58] Field of Search .......... 350/147, 152, 156, 157, 169-174, 350/175

[56] References Cited
UNITED STATES PATENTS
3,443,858   5/1969   LaRussa ............... 350/157

*Primary Examiner*—David Schonberg
*Assistant Examiner*—Paul R. Miller
*Attorney*—Francis L. Masselle, William Grobman and Charles S. McGuire

[57] ABSTRACT

Apparatus to reduce the real image to lens distance in an infinity image display system. By folding the optical path using an arrangement of beamsplitters and polarizers, the image to lens distance may be reduced by almost two thirds.

3 Claims, 3 Drawing Figures

3,682,532

OPTICAL SYSTEM TO REDUCE IMAGE TO LENS DISTANCE BY POLARIZATION CONTROL

This invention relates to visual systems and more particularly to a system which will reduce the screen to lens distance in an infinity image display system.

In visual systems, particularly those used with trainers or simulators such as aircraft or locomotive simulators, it is generally desireable to present an image which appears to be focused at infinity to add realism to the display. The two types of optical systems which have been most used to present an infinity image are those employing spherical mirrors and beamsplitters and those employing lenses. Where the image to be displayed is generated using a motion picture projector, the lens system is simpler to use since it can be implemented using a flat screen, whereas the spherical mirror-beamsplitter system requires projection on a spherical screen.

In a typical system a motion picture is taken in an actual vehicle under conditions similar to those for which training is to be conducted. For example, a motion picture of a landing and take off will be taken from an actual aircraft. The picture will then be displayed in a display system mounted on a simulator cockpit with suitable distortion optics to allow apparent changes in the observer's viewpoint as the simulated position of the trainer changes. Such a system is disclosed in U.S. Pat. No. 3,485,554 granted to H.S. Hemstreet on Dec. 23, 1969 and assigned to the same assignee as the present invention.

In general, in present day systems, the picture is projected on a rear projection screen and an infinity imaging lens placed between the screen and the observer in the simulator. To obtain an image at infinity the screen must be placed at the focal point of the lens system. With lens presently available the minimum distance from lens to screen which is possible is about five feet. In some applications, because of size and mounting considerations this relatively large distance causes problems.

Therefore, it is the object of this invention to provide a means of reducing the screen to lens distance in a lens type infinity image system.

Another object is to provide a more compact visual system.

A further object is to provide an improved visual system for use in simulators.

Other objects of the invention will in part be obvious and will in part appear hereinafter.

The invention accordingly comprises the features of construction, combination of elements, and arrangement of parts, which will be exemplified in the construction hereinafter set forth and the scope of the invention will be indicated in the claims.

For a fuller understanding of the nature and objects of the invention reference should be had to the following detailed description taken in connection with the accompanying drawings in which.

Figure 1:
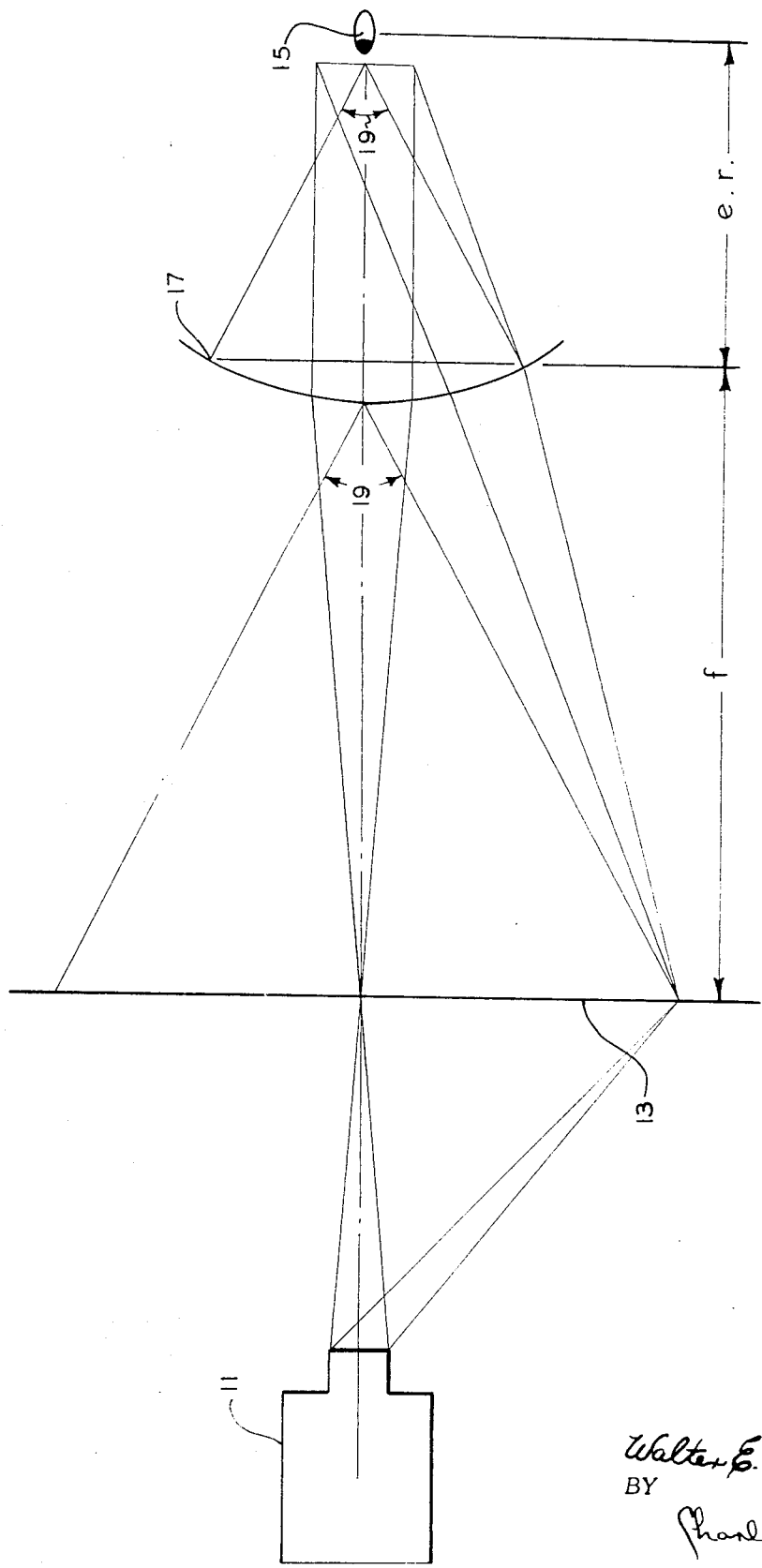
FIG. 1 shows a prior art arrangement of an infinity image display.

FIG. 1 shows a system constructed using methods well known in the art. A projector 11 projects a picture on rear projection screen 13. The rear image projected on the screen is viewed from eye point 15 through infinity imaging optics 17. The size of lens (or, alternatively a group of lenses) 17 is determined by the distance it is to be placed from the eye position 15 (this being termed the eye relief, e.r.) distance and the field of view 19. The smaller the e.r. and/or the field of view, the smaller lens 17 may be. The screen to lens distance $f$ must be equal to the focal length of the lens if it is encompass the same field of view 19. As previously stated, the state of the art in lenses will not allow this distance to be smaller than approximately 5 feet.

Figure 2:
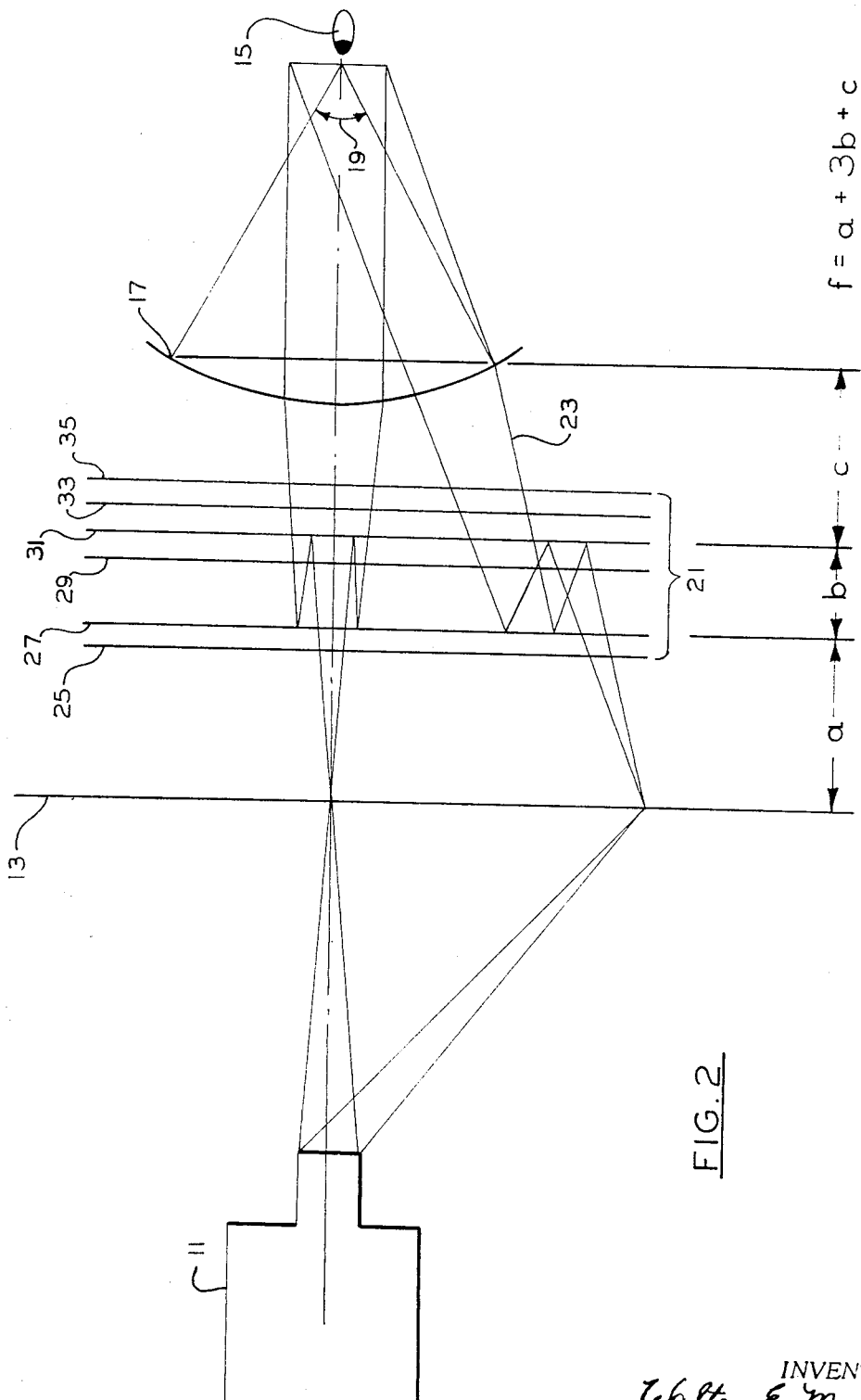
FIG. 2 show the same arrangement with the system of the present invention introduced to reduce the screen lens distance.

FIG. 2 shows how the present invention allows the distance from screen to lens to be shortened by folding the paths of rays between the screen and lens. The eye relief distance will be the same as before. However, the distance between lens 17 and screen 13 is shortened by using the arrangement of polarizers and beamsplitters indicated collectively by the number 21 to fold the path. Although the screen to lens distance is shortened, the rays will still have the same length of travel. Ray 23 is shown traveling the proper distance since it travels a distance $a$ to the first of a pair of beamsplitters, described later in more detail, makes three passes of length $b$ between the beamsplitters, and then travels distance $c$ from the second beamsplitter to lens 17. The total travel is equal to $f$ (i.e., $f = a + 3b + c$)

The use of polarizers to control light is well known in the art. For example see Controlling Light Behavior Through Linear, Circular, and Spectrally-Selective Polarizers by Donald A Dery in Manufacturing Optician, Vol 17 No. 6 (March 1964) pp 268 – 270. A system using the same basic arrangement of polarizers as the present invention but in a different type system is contained in the description of FIG. 1 of U.S. Pat. No. 3,443,858 granted to J. LaRusso on May 13, 1969, which description and drawing is hereby incorporated by reference. Referring to FIG. 2 of the present application, the ray from screen 13 first passes through polarizer 25 which imposes a linear polarization on the light. A portion of the ray then passes through a partially transparent plane mirror 27 commonly termed a beamsplitter. The ray then passes through a conventional quarter waveplate 29 arranged to circularly polarize the light in a right or left direction. (For discussion, right polarization will be assumed.) The circularly polarized light then meets a second beam splitter 31 which will reflect a portion and transmit a portion of the light. The transmitted portion encounters a second quarter waveplate 33 whose fast and slow axes are perpendicular to those of the first quarter waveplate 27, thus causing the light emerging from plate 33 to be linearly polarized at right angles to the polarization resulting from polarizer 25. The light then meets polarizer 35 which has its axis of polarization parallel to that of polarizer 25 and the light is thus blocked.

The portion of right circularly polarized light reflected by beamsplitter 31 is changed to left circularly polarized light by that reflection. When the light passes back through quarter waveplate 29 it will become linearly polarized with its plane of polarization 90° to that of the polarizer 25. The encounters beamsplitter 27 where part is reflected and part transmitted. The transmitted portion will encounter polarizer 25 and, since its plane of polarization is at 90° to that of the polarizer 25, it will not pass through. The reflected portion will again encounter quarter waveplate 29 which will left circularly polarize it. The portion of light which then passes through beamsplitter 31 will encounter quarter waveplate 33 where it will be converted to linearly polarized light with its plane of polarization now parallel to that of polarizer 35. Hence, the remaining portion of light ray 23 will continue on to meet the lens 17 and ultimately be viewed by the observer at eyepoint 15.

Ray 23 has traveled the same distance as it did when the screen 13 and lens 17 were a distance f apart. However, a reduction in the distance between lens 17 and screen 13 of $2b$ has resulted. By making the distances a and c as small as possible, $b$ may be made to approach one third of $f$ and $a$ reduction of almost two thirds will result.

Figure 3:
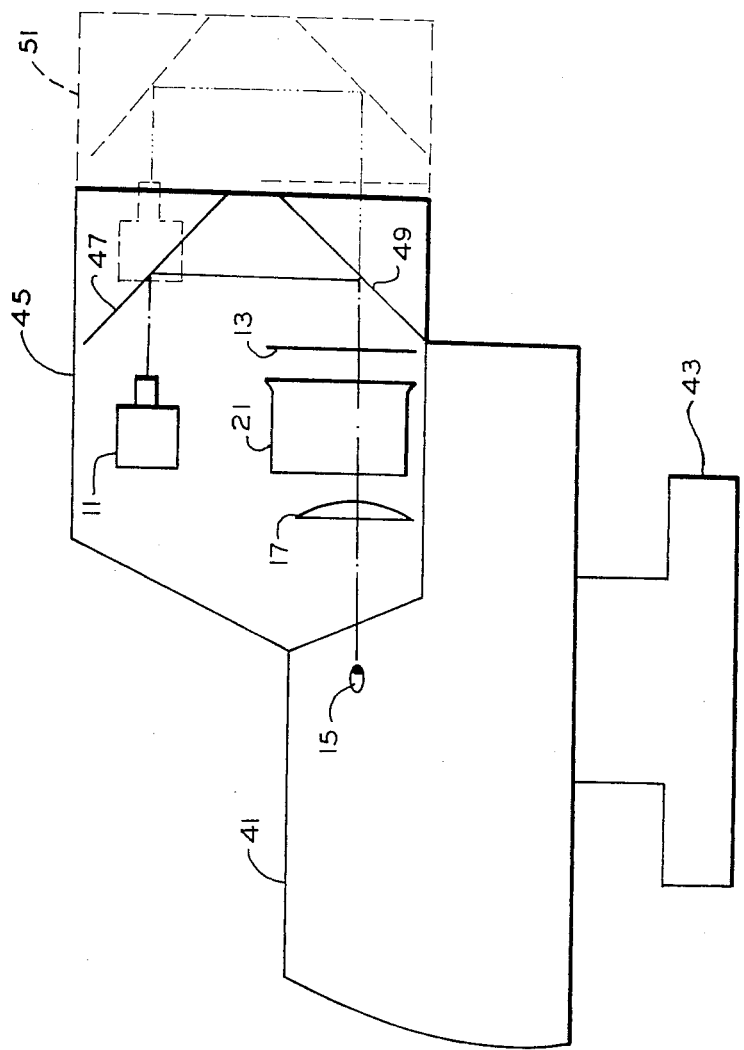
FIG. 3 shows the system of FIG. 2 mounted on a simulator.

FIG. 3 illustrates the usefulness of the system when mounted on a simulator. The simulated cockpit 41 is mounted on a motion base 43. The display system 45 is mounted on the cockpit and will be moved by the motion base along the simulator. With display system 45, projector 11 projects an image onto screen 13 with the projection path folded by mirrors 47 and 49. The image is then displayed through elements 21 and lens 17 to the pilot whose eye is at point 15. The portion 51 enclosed by the dotted lines indicate the increased size of the display 45 if elements 21 are not included. This increase in size and lever arm to the center of gravity of display 45 would cause the motion base to be subject to high loads, making it more complex and costly. By compressing the display system 45, its center of gravity is brought closer to that of the cockpit and motion base loads are reduced.

Thus, a system which allows the screen to lens distance in an infinity image display to be considerably shortened has been shown. Although a particular arrangement with a movie projector and screen as applied to a simulator has been shown it will be obvious to those skilled in the art that basic principle of the invention may be applied to other image sources and other applications.

What is claimed is:

1. In an infinity image display system wherein the image is caused to appear at infinity through use of a lens system, apparatus interposed between the real image plane and the lens system to permit compressing the image plane to lens distance comprising:
    a. a first polarizer disposed on the side of the image plane nearest the lens system;
    b. a first plane beamsplitter on the side of said first polarizer nearest the lens system at a distance $a$ from said image plane;
    c. a first quarter waveplate disposed between said lens system said first beamsplitter said waveplate having its fast and slow axes disposed at substantially 45° to the plane of polarization of said first polarizer;
    d. a second beamsplitter disposed between said first waveplate and said lens system at a distance $b$ from said first beamsplitter.
    e. a second quarter waveplate disposed on the side of said second beamsplitter nearest the lens system; said second quarter waveplate having its fast and slow axes oriented with respect to the corresponding axes of the first quarter waveplate at angles equal to a first substantially integral multiple of 90°; and
    f. a second polarizer disposed on the side of said second quarter waveplate nearest the lens system, said second polarizer having its plane of polarization oriented with respect to the plane of polarization of said first polarizer at an angle equal to a second substantially integral multiple of 90°, one of said multiples being even and the other being odd, whereby the distance $c$ of the lens system from said second beam splitter will equal $(f - a - 3b)$ and the total distance from the image plane to the lens will be $a+b+c$, a reduction of $2b$ over a system without said apparatus interposed.

2. The invention according to claim 1 wherein said real image plane comprises a rear projection screen on which an image has been formed.

3. The invention according to claim 1 wherein said display system is mounted on a vehicle simulator for viewing by an operator thereof.

* * * * *